UNITED STATES PATENT OFFICE.

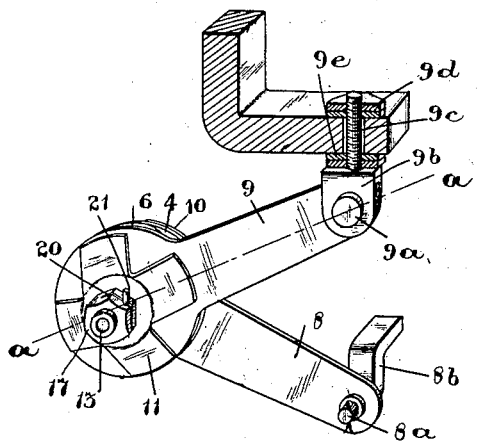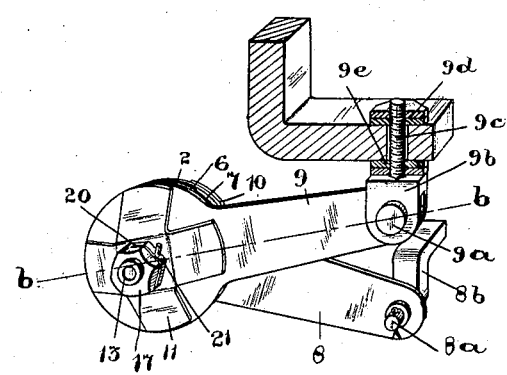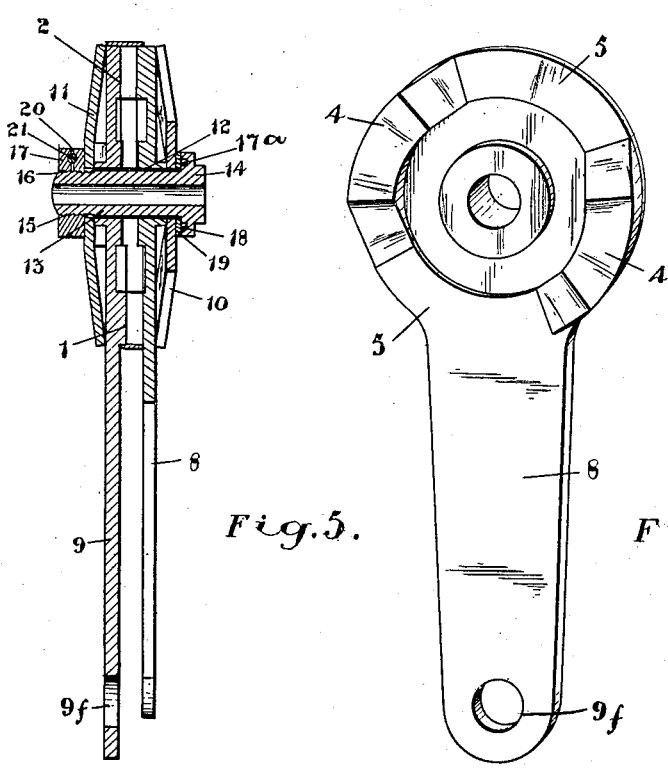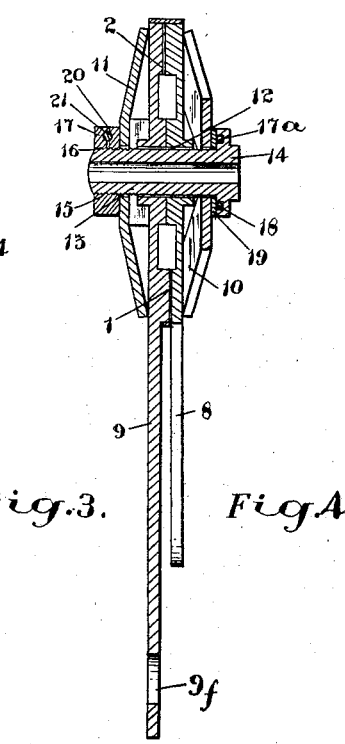

WALLACE CHARLES BROWN, OF TORONTO, ONTARIO, CANADA.

AUXILIARY SPRING.

No. 925,559.          Specification of Letters Patent.          Patented June 22, 1909.

Application filed June 4, 1908. Serial No. 436,600.

*To all whom it may concern:*

Be it known that I, WALLACE CHARLES BROWN, of the city of Toronto, in the county of York, Province of Ontario, Canada, have invented certain new and useful Improvements in Auxiliary Springs; and I hereby declare the following to be a full, clear, and exact description of the same.

This invention relates to auxiliary vehicle springs which will permit of the independent action of the main vehicle springs under normal conditions, and which under abnormal conditions will maintain the equilibrium of the main vehicle springs by furnishing a yielding resistance to the movement of the vehicle parts, particularly when such movement results from a shock caused by the impact of the ground wheels with an obstacle in the path over which the vehicle is passing.

The invention may be said to consist of two oscillatory members each comprising an engaging part and an arm part extending from the engaging part, the contacting faces of the engaging parts being provided with substantially frictionless expanding members having sufficient clearance between them to permit of a limited oscillatory movement before coming into position to expand the engaging parts against the clamping springs which press the engaging parts together, the flexion of the clamping springs being varied by a flexion regulating means which consist of a centering bolt passing centrally through the engaging parts and the clamping springs and one or more regulating nuts mounted on the centering bolt to bear against the outer face or faces of the clamping springs to press them tightly into contact with the outer faces of the engaging members and resist the outward pressure exerted against the clamping springs when the expanding members are engaged.

In carrying the invention into practice the arms of the oscillatory members are preferably connected to the axle and to the vehicle body or main vehicle springs and relatively positioned by means of an adjustable connection adjusted to the approximate load intended to be carried by the vehicle so that the expanding members can instantly expand the engaging members against the clamping springs when the movement of the vehicle body is more than normal, the oscillating movement of the expanding members in their engaged condition increasing the pressure of the clamping springs against the regulating means, so that the pressure of the clamping springs will retard the action of the engaging members and the arms, and consequently the movement of the vehicle body to prevent the full force of the shock being transmitted to the main vehicle springs.

For an understanding of the invention reference is to be had to the following description and to the accompanying drawings in which:—

Figure 1, is a perspective view of the device showing the parts in their inert position. Fig. 2, is a similar view to Fig. 1, with the engaging parts in a retarding position. Fig. 3, is a perspective view of the engaging parts separated to show the formation of their contacting faces. Fig. 4, is a section on the line $a$—$a$ Fig. 1, and Fig. 5, is a section on the line $b$—$b$ Fig. 2.

Like characters refer to like parts throughout the specification and drawings.

The two engaging parts 1, and 2 are each, preferably, of an annular shape, and on the contacting face of the engaging part 1 are two expanding members 4 located diametrically opposite one another with unoccupied spaces 5 between them, and on the contacting face of the engaging part 2 are expanding members 6, similarly positioned, with unoccupied spaces 7 between them. When the engaging parts 1 and 2 are assembled and the parts are inert the expanding members 6 are contained in the spaces 5 and the expanding members 4 are contained in the spaces 7.

Extending radially from the engaging members 1 and 2 are arms 8 and 9 each of the arms being formed with a pin hole $9^f$ by which the arms can be connected to the parts of the vehicle.

Centrally located on the outer faces of the engaging parts are clamping springs 10 and 11 and centrally formed through the clamping springs and engaging parts are bolt apertures 12 for the centering bolt 13. The centering bolt 13 is formed at one end with a bolt head 14 and at the other end with screw threads 15 to engage with the screw threads 16 in the bore of the regulating nut 17 when fitted on the bolt.

When the parts are assembled the engaging part 1 contacts the engaging part 2 and the clamping springs 10 and 11 bear against the outer faces of the engaging parts with the bolt passing through them to hold them together.

To facilitate the turning motion of the engaging parts of the bolt 13 the inner face of the bolt head 14 is formed with an annular channel 17ª in which are contained antifriction balls 18 and interposed between the antifriction balls 18 and the adjacent surface of the clamping spring 10 is a washer 19, to hold the balls in the annular channel 17ª and provide a ball race for them.

The regulating nut 17 is partly split by a saw cut 20 extending into the nut at substantially right angles to the axis of its bore and wedging the sides of the saw cut apart is a wedge 21 which when forced into the nut separates the sides of the saw cut and causes the nut to bind against the screw threads of the bolt so that the regulating nut will be locked in its adjusted position. By tightening the regulating nut on the bolt the clamping springs increase, and by loosening it on the bolt they decrease, their pressure on the engaging parts.

The arms 8 and 9 are preferably connected respectively to the axle and to the vehicle body, frame, or top leaf of the main vehicle spring and when the vehicle is subjected to a shock the motion of the vehicle body and spring yield under the influence of the impact causing the shock, the yielding motion being retarded by the expanding members of the engaging parts riding on one another, the retardation of the shock increasing with the distance the expanding members travel. To facilitate the movement of the expanding members during the oscillation of the engaging parts the former are inclined gradually inward from the end toward the middle so that the movement of one expanding member riding on the other will be of a gradual character.

The arm 8 is provided with a pin 8ª which engages in a clip 8ᵇ to surround the axle. The arm 9 is provided with a pin 9ª upon which is rockably mounted the bifurcated head 9ᵇ of the screw threaded bolt 9ᶜ. Adjustably mounted on the screw threaded part of the bolt 9ᶜ are two sets of adjusting nuts 9ᵈ and 9ᵉ by which the arm 9 can be positioned relatively to the arm 8 with regard to the approximate load the vehicle is intended to carry. The arm 9 can be accurately adjusted to the arm 8 when the vehicle is loaded by adjusting the nuts 9ᵈ and 9ᵉ so as to hold the expanding members 6 relatively to the expanding members 4 to provide a clearance which will permit of a limited oscillation on the part of the expanding members before they come into engagement with one another during the downward movement of the vehicle body. The initial movement of the vehicle body resulting from the shock is in a downward direction and is partly absorbed by the main vehicle springs prior to the engagement of the expanding members with one another. If the main vehicle springs are not of sufficient strength to resist the force of the shock the expanding members come into activity and by riding on one another force the clamping springs against the bolt head and regulating nut thus increasing the pressure of the clamping springs so that they will retard the movement of the engaging parts and arms during the downward motion of the vehicle body and effect the restoration of the main vehicle springs to their equilibrium. If the force of the shock is not expended by the retardation offered by the clamping springs during the downward movement of the vehicle body and the latter moves forcibly upward with the rebound, the expanding members again come into engagement with one another when the body of the vehicle has passed its normal position so that the clamping springs can exert the same retardation on the rebound.

Having thus fully described my invention what I claim as new and desire to secure by Letters Patent is:—

The hereinbefore described device comprising two engaging parts, means whereby the engaging parts may be connected to the vehicle, expanding members for the contacting face of each engaging part with unoccupied spaces between them and of greater dimensions than the expanding members, the expanding members of each engaging part being contained in the unoccupied spaces of the other engaging part whereby the engaging parts will have a limited movement before the expanding members of one engaging part engage with the expanding members of the other engaging part and a yielding means to hold the engaging parts in contact with each other.

Toronto, May 26th, A. D. 1908.

WALLACE CHARLES BROWN.

Signed in the presence of—

C. H. RICHES,

N. R. ROBERTSON.